United States Patent [19]

Fujita et al.

[11] Patent Number: 4,639,040
[45] Date of Patent: Jan. 27, 1987

[54] FIXING DEVICE FOR A VEHICLE SEAT

[75] Inventors: Yasuyuki Fujita; Takaichi Nishino, both of Tokyo, Japan

[73] Assignee: Tachikawa Spring Co., Ltd., Tokyo, Japan

[21] Appl. No.: 799,606

[22] Filed: Nov. 19, 1985

Related U.S. Application Data

[63] Continuation-in-part of Ser. No. 489,785, Apr. 29, 1983, abandoned.

[30] Foreign Application Priority Data

Apr. 30, 1982 [JP]  Japan .................. 57-64704

[51] Int. Cl.$^4$ .............................................. B60N 1/02
[52] U.S. Cl. .................... 297/379; 296/65 A
[58] Field of Search ................. 297/14, 354, 378, 379; 296/63, 65 R, 65 A, 69; 292/216, 341.12, DIG. 41, DIG. 56

[56] References Cited

U.S. PATENT DOCUMENTS

| | | | |
|---|---|---|---|
| 3,262,725 | 7/1966 | Ballantyne | 297/379 X |
| 3,817,571 | 6/1974 | Horvat et al. | 296/65 A |
| 3,848,911 | 11/1974 | Watermann et al. | 292/216 |
| 3,973,799 | 8/1976 | Berg | 296/65 R X |
| 4,106,809 | 8/1978 | Minka | 296/69 |
| 4,358,141 | 11/1982 | Hamada | 292/216 |

FOREIGN PATENT DOCUMENTS

| | | | |
|---|---|---|---|
| 957452 | 1/1957 | Fed. Rep. of Germany | 296/65 R |
| 1310367 | 10/1962 | France | 296/65 R |
| 1949085 | 2/1979 | France | 297/379 |
| 56-82638 | 7/1981 | Japan | 297/354 |

Primary Examiner—William E. Lyddane
Assistant Examiner—James R. Brittain
Attorney, Agent, or Firm—Watson, Cole, Grindle & Watson

[57] ABSTRACT

A fixing device for a vehicle seat back comprises a support element mounted on the vehicle side wall, and a pivotal hook element engageable with the support element. A set part of the support element includes a hook-preventing upward extension for preventing the hook element from slipping off the set part. A bracket is mounted on the seat back together with the hook element, the bracket having a leg supporting a cushion which engages the set part in an upright and a locked position of the seat back. The bracket leg has an edge confronting the extension and engages therewith upon application of external forward and rearward loads on the seat back.

1 Claim, 8 Drawing Figures

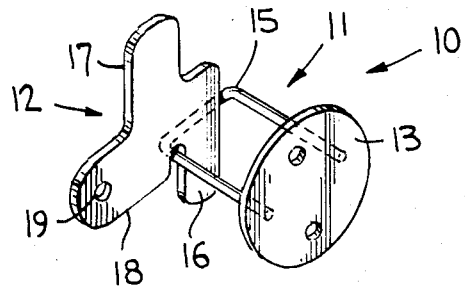
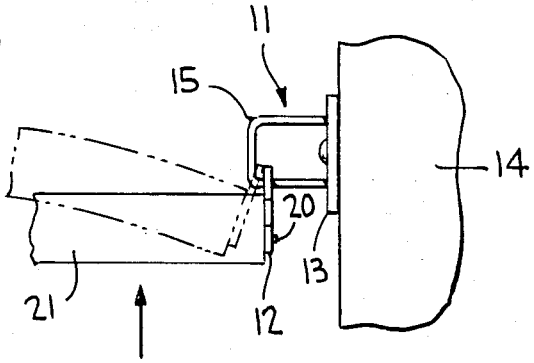
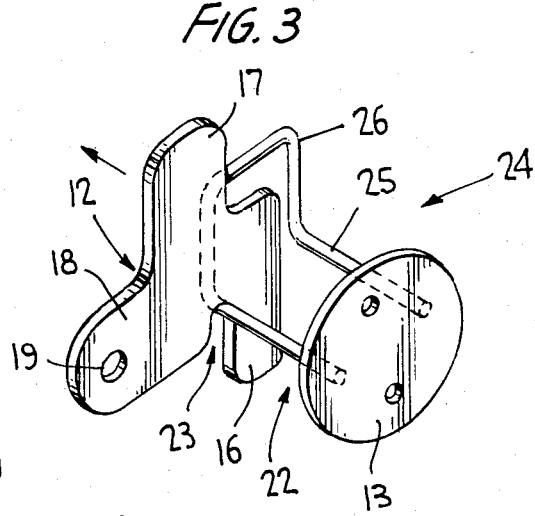
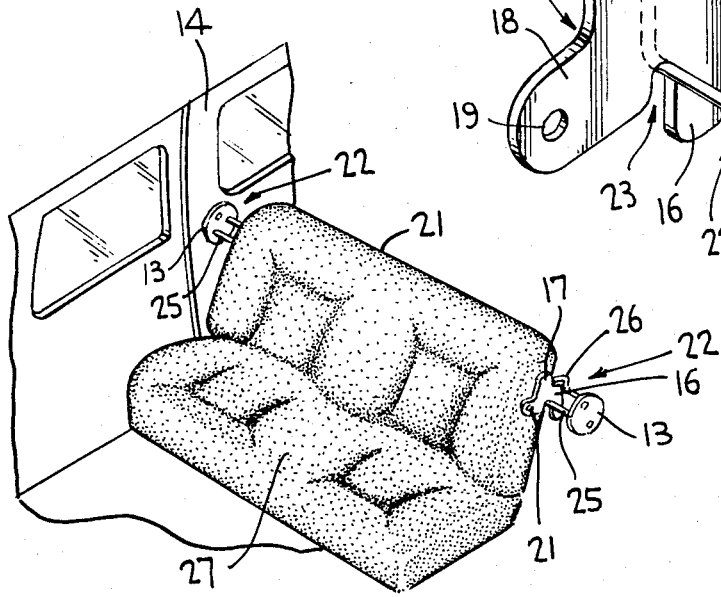

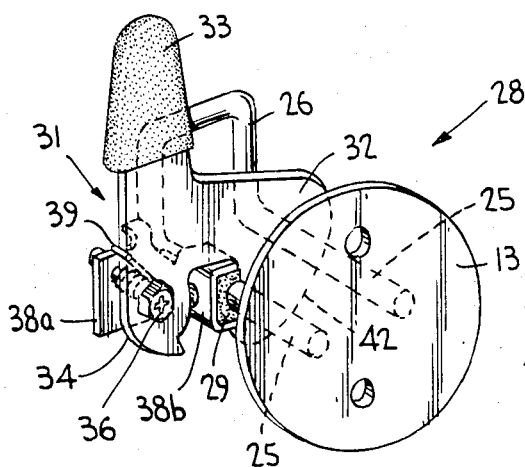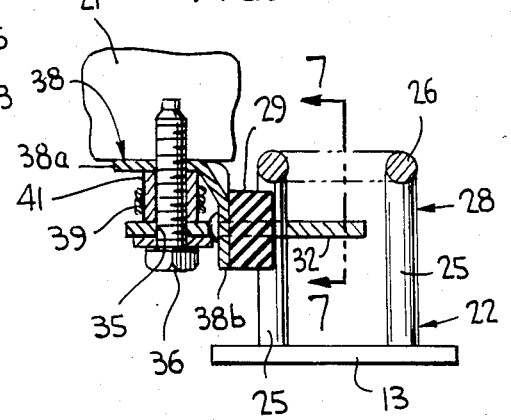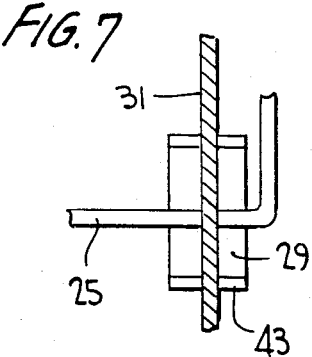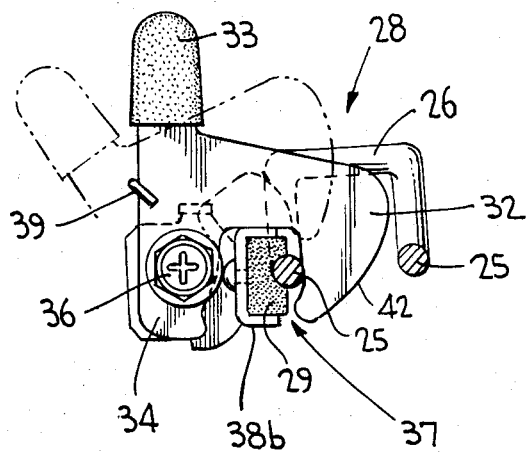

FIXING DEVICE FOR A VEHICLE SEAT

RELATED APPLICATION

This application is a continuation-in-part of U.S. patent application Ser. No. 489,785, filed Apr. 29, 1983, abandoned.

BACKGROUND OF THE INVENTION

This invention related generally to a fixing device for a motor vehicle seat, and more particularly to such a fixing device which comprises a support element for fixing a seat back to a side wall of the vehicle, and a hook element engageable with the support element, the hook element being mounted for pivotal movement on an upper portion of the seat back.

A known fixing device 10 is shown in FIGS. 1A and 1B for fixing the upper portion of a forwardly foldable seat back to the side wall of a motor vehicle so as to prevent the seat from being forwardly folded unintentionally. The fixing device comprises a support element 11 and a hook element 12 engageable therewith. The support element includes a base plate 13 fixedly mounted on a side wall 14 of the motor vehicle, and a U-shaped set part 15 secured to and extending horizontally from the base plate.

Hook element 12 has a hook part 16 which engages the forward leg of set part 15, an operative part 17 to facilitate manual pivoting of the hook element, and a pivot portion 18 having a hole 19 through which a fastener 21 extends for pivotally mounting hook element 12 to the upper portion of a seat back 21.

Thus, when the hook element is manually pivoted so that its hook part 16 engages set part 15 for fixing seat back 21 to side wall 14, and when an external load is applied to the seat back in the direction of the arrow of FIG. 1B, the seat back is caused to bend or distort to its phantom outline position such that hook element 12 slips off sideways from the set part with which it engages thereby causing the seat back to be overturned rearwardly.

In order to remedy such problems, means have been provided to reinforce the seat back itself so as to minimize its bending or distortion after being hooked in place. However, such a remedy may tend to affect the requirements for reducing the weight of the seat.

SUMMARY OF THE INVENTION

It is therefore the main object of the invention to provide an improved fixing device which overcomes the drawbacks of conventional fixing devices.

This objective is achieved by only slightly modifying the conventional fixing devices. According to the invention, an improved fixing device is provided in which the hook element will not slip off the set part with which it engages even if the seat back is bent or deformed upon the application of an external load acting thereon. Specifically, an upwardly extending slip-off preventing extension is provided at the free end of the set part of the support element so that even when an external load is applied to the seat back in a forward or a rearward direction, the extension is contacted by the confronting surface of the hook element so that the hook element retains its locked position. Thus, since the locked position is maintained, there is no need for reinforcing the seat back.

In accordance with a further embodiment, a bracket is fixed to the upper portion of the seat back, the bracket having a substantially C-shaped leg lying parallel to the set part with which the hook element engages, this leg having cushioning material thereon for cushioning the engagement between the hook element and the support element. And, this leg has an edge confronting the slip-off preventing extension for engagement therewith upon the application of external loads against the seat back for thereby preventing the hook element from slipping off the set part.

BRIEF DESCRIPTION OF THE DRAWINGS

These objects and other objects and advantages of the invention will become more apparent to those skilled in the art from the following detailed description of the invention with reference to the several drawings. The same reference numerals refer to similar elements throughout the drawings wherein:

FIG. 1A is a perspective view of a known fixing device;

FIG. 1B is a view showing the device of FIG. 1A in which it is used to fix a seat back to a side wall of a motor vehicle;

FIG. 2 is a perspective view of a seat of a motor vehicle with the fixing device according to the invention shown fixing the seat back to the side wall of the vehicle;

FIG. 3 is a perspective view, at an enlarged scale, of the fixing device of FIG. 2;

FIG. 4 is a perspective view of a fixing device of an other embodiment of the invention provided with a silencer;

FIG. 5 is a longitudinal sectional view of the device of FIG. 4;

FIG. 6 is a front sectional view of the device of FIG. 4; and

FIG. 7 is a sectional view taken substantially along the line 7—7 of FIG. 5.

DETAILED DESCRIPTION OF THE INVENTION

FIGS. 2-6 illustrate preferred embodiments of the present invention. Specifically, FIGS. 2 and 3 show a fixing device generally designated 22 which includes a hook element 12 similar to the hook element of FIG. 1. The hook element comprises a plate of metal or hard resin pivotally mounted at each side of the upper portion of seat back 21 by a fastener 20 which extends into a solid frame element of the seat back. As shown in FIG. 3, the hook element comprises hook part 16, operative part 17 and pivot portion 18, a cutout or groove 23 being provided between 16 and 18 to facilitate engagement between the hook element and a support element generally designated 24. This support element has a base plate 13 for fixedly mounting the support element to side wall 14 of the vehicle, and a set part 25 affixed to the base plate and having a pair of spaced, horizontally extending legs. Groove 23 of the hook element is slightly wider than the thickness of the leg with which the hook element engages. Support element 24 further comprises a slip-off preventing extension 26 which is integral with and extends upwardly from set part 25. A single wire may be used to form the set part and the extension.

When the hook element is manually pivoted via operative part 17 such that groove 23 engages a forward leg of set part 25, a locked condition is established such that the upper portion of the seat back is fixed to vehicle wall 14. In such condition, a portion of extension 26 confronts operative part 17.

Thus, upon the application of external forward or rearward loads to the seat back, the hook element receives a force shown by the arrow of FIG. 3 and tends to move in that direction. However, extension 26 will prevent the hook element from slipping off set part 25 as the side of the hook element which confronts extension 26 engages the extension.

When operative part 17 is manually moved for pivoting the hook element forwardly, seat back 21 is released from its locked condition and may be folded to overlie seat bottom 27. The rear, and now upper, surface of the thus folded seat back and can therefore be used for loading cargo.

As described above, since the slip-off preventing extension is provided at a load applying direction of the hook element, the hook element is prevented from slipping off the support element. Consequently, there is no need for reinforcing the seat back to prevent the hook element from slipping off. Further, since the slip-off preventing extension can be made simply by upwardly folding the ends of a set part of a conventional fixing device, no different or particular system is required. In such manner, an improved device of simple and lightweight structure is obtained.

FIGS. 4–6 illustrate an embodiment of a fixing device generally designated 28 as having a silencer 29. A hook element 31 includes a hook part 32 in engagement with a forward leg of set part 25 of the support element 30 which is the same as support element 24 of FIGS. 2 and 3. The hook element further includes an operative part 33 and a pivot portion 34 having a hole 35 through which a bolt 36 extends for pivotally mounting the hook element to the upper portion of seat back 21. The bolt extends into a solid frame element of the seat back for rigidly mounting the hook element in place. A groove 37 between the hook part and the pivot portion is slightly wider than the thickness of the leg of set part 25 with which the hook part engages plus the thickness of the silencer and the thickness of a bracket 38. Hook 32 is urged into a locked position under the action of a coil spring 39 which surrounds a bushing 41 through which the bolt 36 extends. The bushing extends between a leg 38a of bracket 38 and hook element 31. One end of the spring is affixed to bushing 31 and its other end engages pivot portion 34 of the hook element.

Free end 42 of hook part 32 has a downwardly sloping smooth contour. Therefore, when the seat back is raised to its upper position of FIG. 2, edge 42 impacts against the forward leg of set part 25 (that leg lying nearest the hook element) thereby causing the hook element to pivot counterclockwise (when viewing FIG. 6) so as to thereafter snap behind the forward leg of the set part so as to lie within groove 37 under the force of spring 39. Thus, the hook part 32 assumes a locked position shown in FIGS. 4 and 6. In such manner, when seat back 21 is raised to its upright position, a locked condition is automatically established without the need for manually adjusting operative part 33 of the hook element.

Silencer or cushion 29 comprises a piece of elastomeric material such as rubber or foam, and is affixed to a substantially C-shaped leg 38b of bracket 38. The cushion lies at such an elevation as to impact against the forward leg of set part 25 when the seat back is in its upright position, as shown in FIGS. 4–7. Thus, even when the hook element is disengaged from the set apart, as shown in phantom outline in FIG. 6, the seat back is prevented from moving rearwardly beyond its upright position. Moreover, since cushion 29 engages the leg of the set part during locking, noise is attenuated, and the silencer produces a cushioning effect and produces a tight locked condition when the hook element is engaged.

As shown in FIGS. 4, 6 and 7, leg 38b of the bracket is essentially of C-shaped cross-section which surrounds the cushion on three sides. An edge 43 of this C-shaped leg confronts extension 26 of the support element, and is spaced slightly away therefrom in the upright position of the seat back. Thus, upon application of external rearward or forward forces against the seat back, the seat back will tend to deform whereupon bracket 38 will shift in the direction along set part 25 toward extension 26 (as in the direction of the arrow of FIG. 3) until edge 43 contacts extension 26. Thus, the hook element is prevented from slipping off the set part in the same manner as described with reference to FIGS. 2 and 3.

From the foregoing, it can be seen that the slip-off preventing extension can be made simply by upwardly bending the ends of the set part of the conventional support element. Therefore, the fixing device can be made without requiring any major changes. And, there is no need to reinforce the seat back so as to avoid undue deformation. And, since the hook element is firmly locked by the slip-off preventing extension, the seat back itself will be stably fixed.

Obviously, many other modifications and variations of the present are made possible in light of the above teachings. It is therefore to be understood that within scope of the apended claim, the invention may be practiced otherwise than as specifically described.

What is claimed is:

1. A fixing device for a vehicle having a forwardly foldable seat back, comprising a support element adapted to be mounted to a side wall of the vehicle opposite an upper portion of the vehicle seat back, and a hook element engageable with said support element for locking said seat back relative to said side wall, said support element comprising a base plate for mounting said support element in place, a substantially horizontal set part affixed at one end to said base plate, and a slip-off preventing extension extending upwardly from the other end of said set part, said extension and said set part comprising a single, bent, rigid wire, a bolt rigidly secured to said upper portion of said seat back and extending outwardly thereof, said hook element being mounted on said bolt for pivotal movement about the axis thereof, said hook element comprising a plate having a hook part engageable with said set part, and an operative part for manually pivoting said hook element, a bracket fixedly secured to said upper portion of said seat back, said bracket having one leg with an opening through which said bolt extends for fixing said bracket in place, and said bracket having another leg lying parallel to said set part of said support element, cushioning material affixed to said another leg and abutting against said set apart for preventing a rearward folding of said seat back and for cushioning engagement between said hook element and said support element, said another leg having an edge confronting said slip-off preventing extension for engagement therewith upon the application of external rearward and forward forces against said seat back for thereby preventing said hook element from slipping off said set part.

* * * * *